United States Patent
Zeniya et al.

(10) Patent No.: US 10,551,825 B2
(45) Date of Patent: Feb. 4, 2020

(54) NUMERICAL CONTROLLER FOR CONTROLLING CORNER SPEED OF A MACHINE

(71) Applicant: FANUC CORPORATION, Minamitsuru-gun, Yamanashi (JP)

(72) Inventors: Shintarou Zeniya, Yamanashi (JP); Takeshi Mochida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/818,915

(22) Filed: Nov. 21, 2017

(65) Prior Publication Data

US 2018/0143619 A1    May 24, 2018

(30) Foreign Application Priority Data

Nov. 22, 2016    (JP) .................................. 2016-227002

(51) Int. Cl.
    *G05B 19/416*    (2006.01)
(52) U.S. Cl.
    CPC .................. *G05B 19/4166* (2013.01); *G05B 2219/35178* (2013.01)
(58) Field of Classification Search
    CPC ........... G05B 2219/33102; G05B 2219/34288; G05B 2219/49164; B29D 11/00971
    See application file for complete search history.

(56) References Cited

U.S. PATENT DOCUMENTS

| | | | |
|---|---|---|---|
| 5,012,069 A * | 4/1991 | Arai | B23K 26/0853 219/121.62 |
| 5,200,680 A | 4/1993 | Sasaki et al. | |
| 5,532,932 A * | 7/1996 | Niwa | G06N 7/04 700/188 |

(Continued)

FOREIGN PATENT DOCUMENTS

| | | | |
|---|---|---|---|
| JP | H 0272414 A | 3/1990 | |
| JP | H02137006 A | 5/1990 | |

(Continued)

OTHER PUBLICATIONS

Notification of Reasons for Refusal for Japanese Application No. 2016-227002, dated Jun. 26, 2018, with translation, 11 pages.

Primary Examiner — Thomas C Lee
Assistant Examiner — Charles Cai
(74) Attorney, Agent, or Firm — RatnerPrestia (57) ABSTRACT

To provide a numerical controller that is capable of analyzing a machining program so as to determine whether machining is machining placing emphasis on accuracy and machining placing emphasis on speed and vary an allowable speed difference. The numerical controller includes a determination unit and a corner deceleration control unit. The determination unit analyzes a machining program so as to determine which machining is to be performed between machining placing emphasis on accuracy and machining placing emphasis on speed. The corner deceleration control unit executes corner deceleration control based on a speed difference between cutting feed speeds on blocks leading (Continued)

and following a corner and an allowable speed difference which is predetermined. At this time, the corner deceleration control unit varies the allowable speed difference in accordance with a determination result of the determination unit.

5 Claims, 7 Drawing Sheets

(56) References Cited

U.S. PATENT DOCUMENTS

| | | | | |
|---|---|---|---|---|
| 7,070,368 | B2* | 7/2006 | Murakami | B23Q 15/013 |
| | | | | 409/80 |
| 7,450,127 | B2* | 11/2008 | Hong | G05B 19/41 |
| | | | | 318/569 |
| 2005/0241843 | A1 | 11/2005 | Fujibayashi et al. | |
| 2011/0190925 | A1 | 8/2011 | Fujishima et al. | |
| 2012/0296462 | A1 | 11/2012 | Otsuki et al. | |

FOREIGN PATENT DOCUMENTS

| | | |
|---|---|---|
| JP | H03084604 A | 4/1991 |
| JP | H07241686 A | 9/1995 |
| JP | H09108863 A | 4/1997 |
| JP | 2000301370 A | 10/2000 |
| JP | 2011158982 A | 8/2011 |
| JP | 2012243152 A | 12/2012 |

\* cited by examiner

FIG.1A

CORNER ANGLE

BEAM ON
(G01 Q100)

BEAM OFF
(G01 Q0)

- CASE WHERE EXTERIOR ANGLE OF CORNER ANGLE IS RELATIVELY SMALL

- CASE WHERE EXTERIOR ANGLE OF CORNER ANGLE IS RELATIVELY LARGE

FIG.7

NUMERICAL CONTROLLER FOR CONTROLLING CORNER SPEED OF A MACHINE

CROSS-REFERENCE TO RELATED APPLICATIONS

This application is a new U.S. Patent Application that claims benefit of 2016-227002, filed Nov. 22, 2016, the disclosure of this application is being incorporated herein by reference in its entirety for all purposes.

BACKGROUND OF THE INVENTION

1. Field of the Invention

The present invention relates to a numerical controller and especially, relates to a numerical controller which can decrease a speed corresponding to a machining content.

2. Description of the Related Art

A numerical controller often performs speed control for increasing or decreasing a cutting feed speed before and behind a point (corner) on which a moving direction of a tool is changed. This control is called corner deceleration. The corner deceleration prevents shock or vibration acting on a machine tool and thus can secure machining accuracy. When a cutting feed speed is too high at a corner, a trajectory of a tool is inwardly generated in practical machining with respect to a machining path which is instructed by a machining program and thus, machining accuracy is degraded.

Figure 1A:
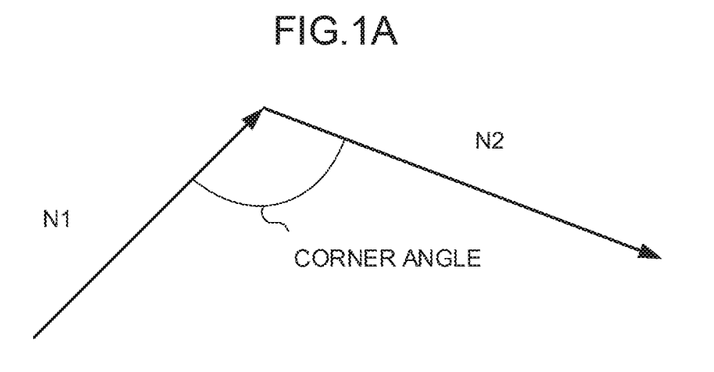
FIG. 1A illustrates an example of a conventional corner deceleration control method.

Japanese Patent Application Laid-Open No. 02-072414 discloses a corner deceleration method in which a cutting feed speed in machining a corner is decreased in accordance with a corner angle between machining blocks and a cutting feed speed of each axis. As illustrated in FIG. 1A, in the case of machining of a path in which a machining block N1 and a machining block N2 are connected in a manner to form a certain corner angle, a numerical controller calculates speed differences between the front and the rear of the corner in the X axis and the Y axis. In the case where the speed difference in the X axis or the Y axis exceeds an allowable speed difference which is a predetermined threshold value, the numerical controller executes corner deceleration control so that the speed differences in the X axis and the Y axis do not exceed the allowable speed difference.

Figure 1B:
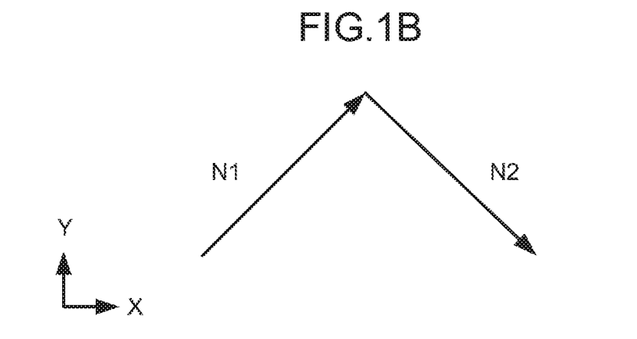
FIG. 1B illustrates an example of the conventional corner deceleration control method.

In a machining path illustrated in FIG. 1B, for example, since a moving direction in the Y axis reverses before and behind a corner, a large speed difference is generated and corner deceleration easily occurs. Further, in the case of a use of a relatively high-speed machining method such as laser machining, even slight change of a moving direction easily generates speed difference which exceeds an allowable speed difference and easily generates corner deceleration.

Figure 2A:
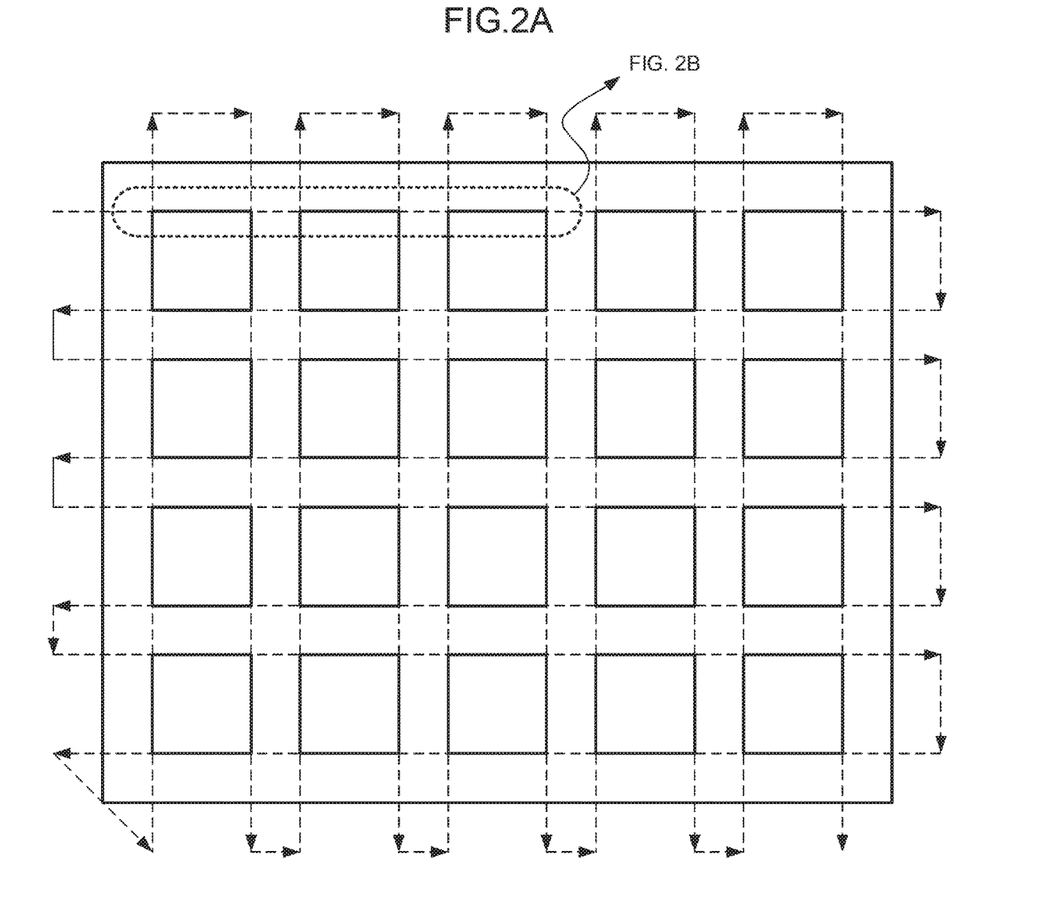
FIG. 2A illustrates an example of laser machining.
Figure 2B:
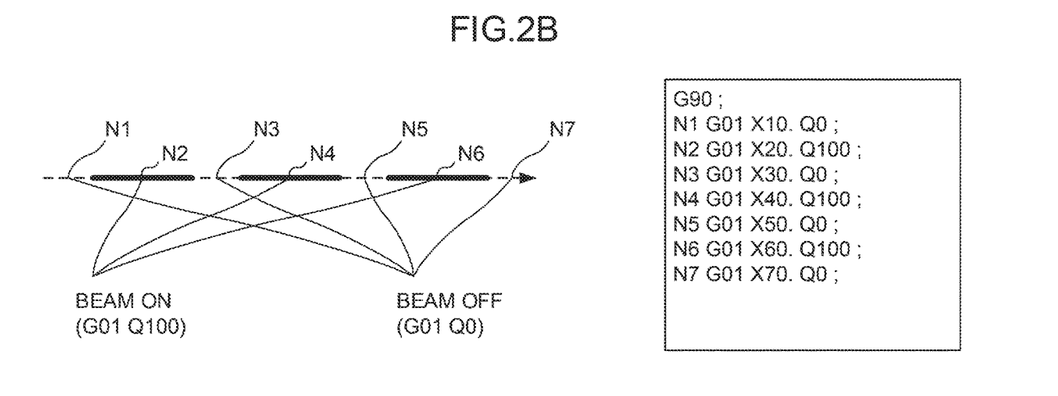
FIG. 2B illustrates the example of the laser machining.

According to laser machining, intermittent cutting can be performed at high speed by repeatedly instructing turning on/off of a beam on a cutting feed block, for example. FIGS. 2A and 2B illustrate an example of such intermittent cutting. In FIG. 2A, a solid line part in a machining path is a part subjected to cutting and a dashed line part is a part which is not subjected to cutting. The right drawing in FIG. 2B illustrates a machining program for performing such machining. The left drawing in FIG. 2B is a schematic diagram illustrating an execution result of this machining program. In this machining program, cutting feed blocks (G01 etc.) are successive and the on and off of a beam are switched by changing duties (Q0/Q100) of a laser command condition.

Figure 3:
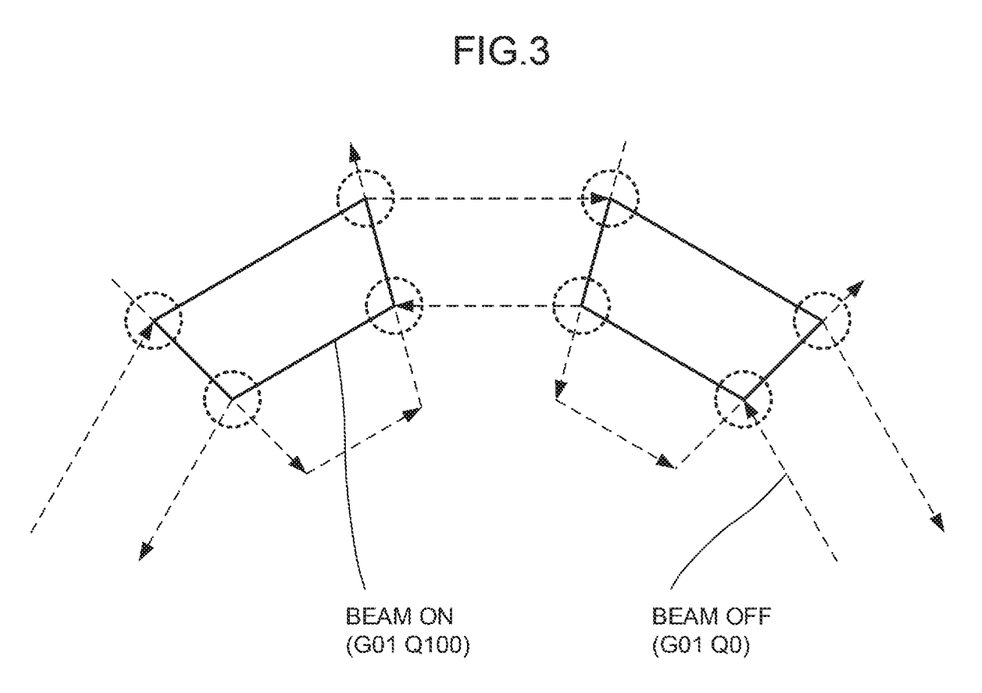
FIG. 3 illustrates an example of laser machining.

Here, the case where laser machining is similarly performed with respect to a machining path illustrated in FIG. 3 is discussed. This machining path includes corner parts circled by dashed lines. In such corner parts as well, corner deceleration occurs depending on a corner angle between machining blocks and a cutting feed speed of each axis. Laser machining used also in the example of FIG. 3 is performed at a very high speed compared to contour machining such as milling. Therefore, even a small corner angle easily causes a large speed difference and easily generates corner deceleration.

In the case where machining placing emphasis on machining accuracy is desired to be performed, corner deceleration is necessary and important control. On the other hand, in the case where machining placing emphasis on speed is desired to be performed, corner deceleration sometimes interferes with speed improvement. Therefore, conditions for generating corner deceleration have been conventionally controlled by changing parameter setting of an allowable speed difference by a program command between the case of machining placing emphasis on speed and the case of machining placing emphasis on accuracy, for example. However, such work has taken a lot of effort.

SUMMARY OF THE INVENTION

The present invention has been made to solve the above-described problems, and an object of the present invention is to provide a numerical controller which is capable of determining whether machining is machining placing emphasis on accuracy or machining placing emphasis on speed through analysis of a machining program so as to change an allowable speed difference.

A numerical controller according to an embodiment of the present invention includes a corner deceleration control unit that executes corner deceleration control based on a speed difference between cutting feed speeds on blocks leading and following a corner and an allowable speed difference which is predetermined, and a determination unit that analyzes a machining program so as to determine which machining is to be performed between machining placing emphasis on accuracy and machining placing emphasis on speed, in which the corner deceleration control unit varies the allowable speed difference in accordance with a determination result of the determination unit.

In the numerical controller according to another embodiment, the determination unit determines which machining is to be performed between machining placing emphasis on accuracy and machining placing emphasis on speed, based on an ON/OFF state of a beam with respect to blocks leading and following a corner.

In the numerical controller according to still another embodiment, the determination unit determines which machining is to be performed between machining placing emphasis on accuracy and machining placing emphasis on speed, based on an angle formed by blocks leading and following a corner.

In the numerical controller according to yet another embodiment, the determination unit determines which machining is to be performed between machining placing emphasis on accuracy and machining placing emphasis on speed, based on a difference between command values of blocks leading and following a corner.

In the numerical controller according to yet another embodiment, the corner deceleration control unit executes the corner deceleration control by using the allowable speed difference for high-speed machining in a case where the determination unit determines that speed is to be emphasized and executes the corner deceleration control by using the allowable speed difference which is normal in a case where the determination unit determines that accuracy is to be emphasized.

According to the present invention, a numerical controller which is capable of determining whether machining is machining placing emphasis on accuracy or machining placing emphasis on speed through analysis of a machining program so as to change an allowable speed difference can be provided.

BRIEF DESCRIPTION OF THE DRAWINGS

The above-described and other objects and features of the present invention will be apparent from the following embodiments which are described in reference to the accompanying drawings. Among these drawings.

DETAILED DESCRIPTION OF THE PREFERRED EMBODIMENTS

Embodiments according to the present invention will be described below with reference to the accompanying drawings.

Figure 7:
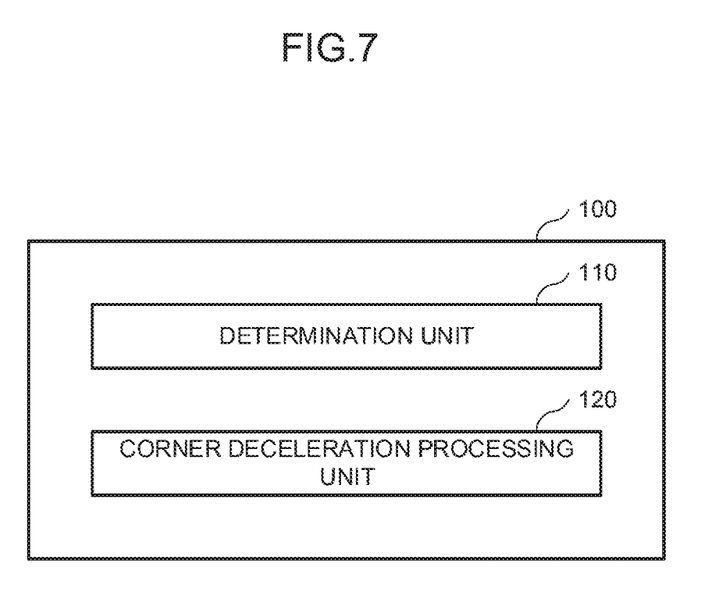
FIG. 7 is a block diagram illustrating the configuration of the numerical controller according to the embodiments of the present invention.

FIG. 7 is a block diagram illustrating the configuration of a numerical controller 100 according to the embodiments of the present invention. The numerical controller 100 includes a determination unit 110 and a corner deceleration processing unit 120. The numerical controller 100 is typically an information processing apparatus provided with a central processing unit (CPU), a storage device, and an input/output device. In the numerical controller 100, the CPU executes a prescribed program so as to logically realize the determination unit 110 and the corner deceleration processing unit 120.

The determination unit 110 performs processing such that the determination unit 110 analyzes a machining program so as to determine which machining is to be performed between machining placing emphasis on accuracy and machining placing emphasis on speed, in light of a predetermined condition.

The corner deceleration processing unit 120 determines necessity of an execution of corner deceleration processing, which is performed by using a normal allowable speed difference or an allowable speed difference for high-speed machining, in accordance with the determination result obtained by the determination unit 110. Further, the corner deceleration processing unit 120 executes the corner deceleration processing in accordance with the determination result thereof.

First Embodiment

Figure 4A:
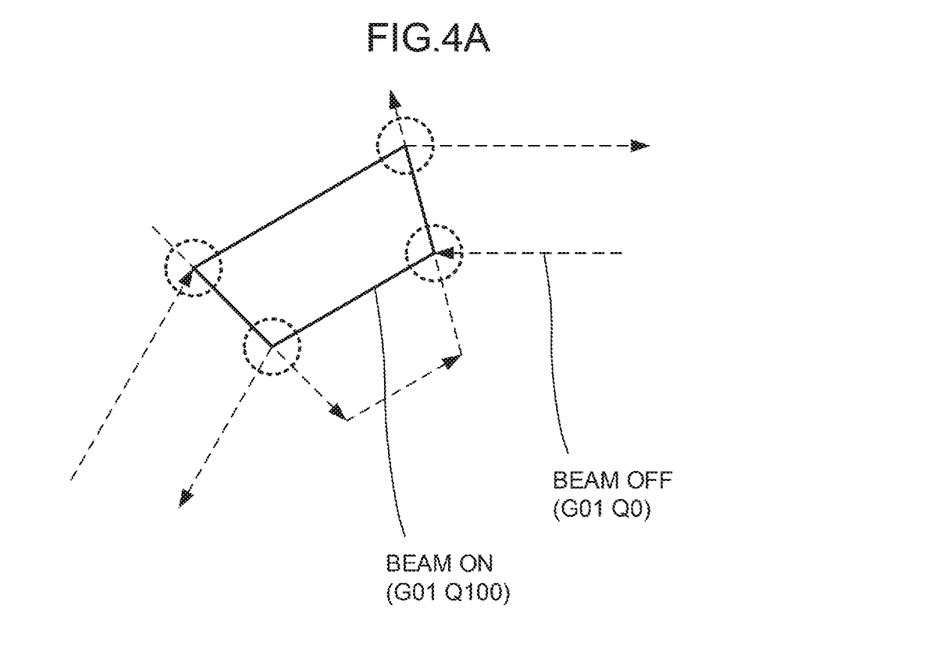
FIG. 4A illustrates an example of a corner deceleration control method employed by a numerical controller according to an embodiment of the present invention.

As the first embodiment, an operation of the numerical controller 100 in the case of machining of paths illustrated in FIGS. 4A and 4B will be described. In both of FIG. 4A and FIG. 4B, the numerical controller 100 repeatedly turns on/off a beam on the ways of cutting feed blocks (G01 etc.), thus performing intermittent cutting.

In general, in the case of employing such machining method, it can be considered that a user desires machining placing emphasis on speed. Therefore, the determination unit 110 determines that high-speed machining is to be performed on this corner in the case where blocks leading and following the corner are both cutting feed blocks (G01 etc.) and the on and off of the beam are switched between before and behind the corner (FIG. 4A). In this case, the determination unit 110 may calculate an angle θ (0°≤θ<180°) formed by the blocks leading and following the corner and further determine whether or not the angle θ exceeds a prescribed threshold value so as to determine that high-speed machining is to be performed only in the case where the angle θ does not exceed the prescribed threshold value.

Figure 4B:
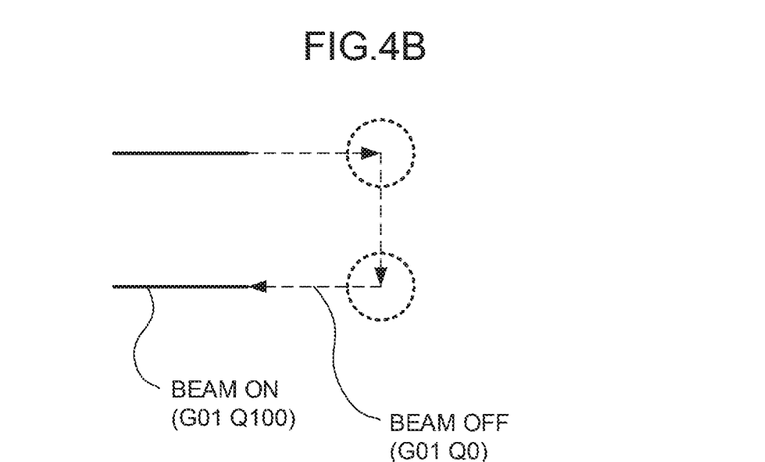
FIG. 4B illustrates an example of a corner deceleration control method employed by the numerical controller according to the embodiment of the present invention.

Further, in the case where blocks leading and following a corner are both cutting feed blocks (G01 etc.) and a beam is off both before and behind the corner, the determination unit 110 determines that high-speed machining is to be performed on this corner (FIG. 4B). Here, since machining accuracy is basically ignorable in this case, the above-described determination based on the angle θ does not have to be always performed.

When the determination unit 110 determines that high-speed machining is to be performed, the corner deceleration processing unit 120 performs corner deceleration control by using a predetermined allowable speed difference for high-speed machining. In other cases, the corner deceleration processing unit 120 performs corner deceleration processing by using a normal allowable speed difference. An allowable speed difference for high-speed machining is preferably set to have a value larger than a normal allowable speed difference. That is, in the case where machining placing emphasis on speed is to be performed, the corner deceleration processing unit 120 automatically changes an operation condition of the corner deceleration control. Accordingly, reduction in a machining speed caused by excessive corner deceleration can be suppressed.

Figure 6:
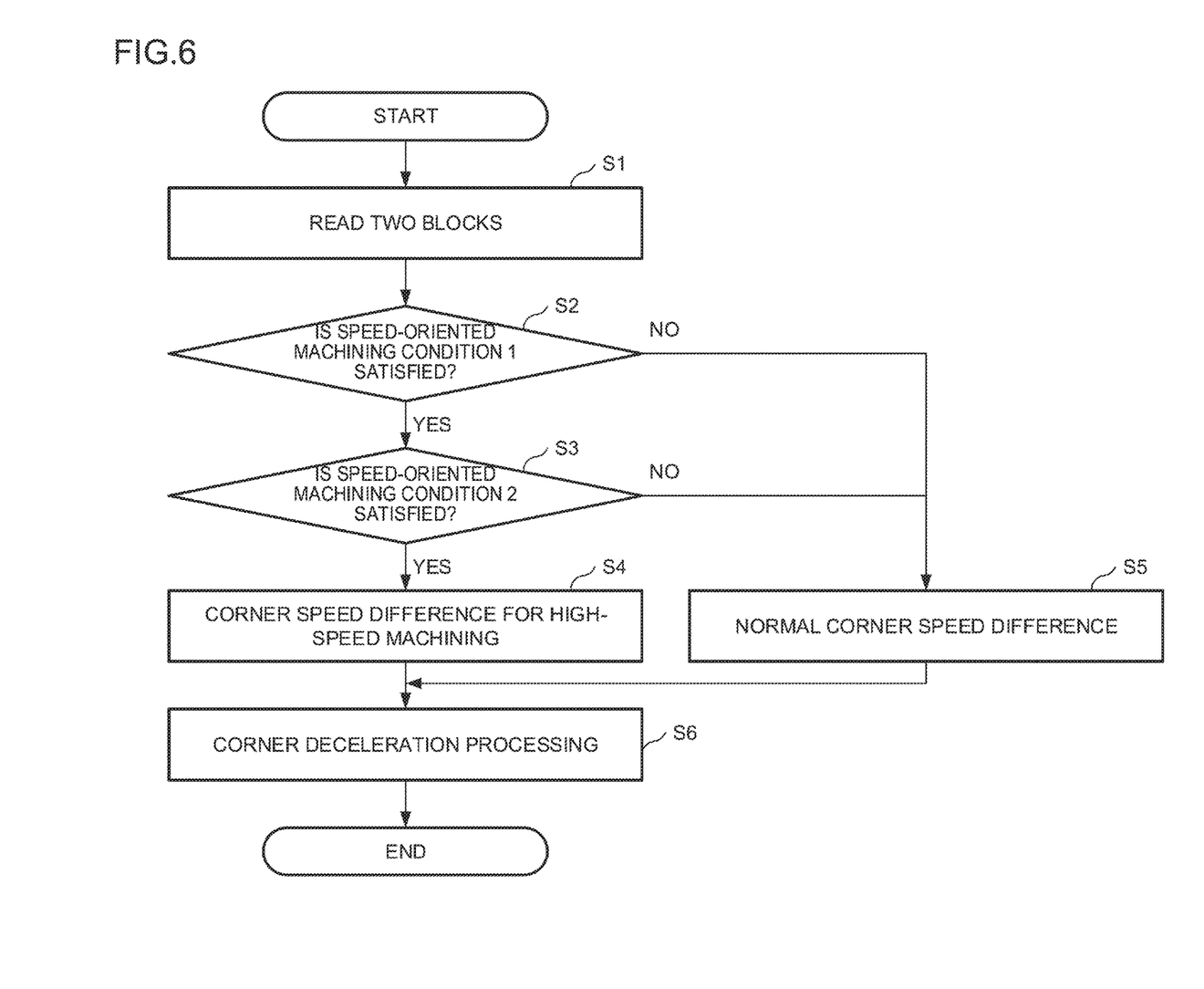
FIG. 6 is a flowchart illustrating an operation of the numerical controller according to the embodiments of the present invention.

The operation of the numerical controller 100 in the first embodiment will be described with reference to a flowchart of FIG. 6.

S1: The determination unit 110 reads out two successive machining blocks in a machining program. The determination unit 110 typically reads ahead a machining block to which processing is to be executed next, during an execution of processing for a machining block.

S2: The determination unit 110 determines whether the two machining blocks read in S1 are both cutting feed blocks, and whether a beam is on with respect to one of the machining blocks and the beam is off with respect to the other of the machining blocks (speed-oriented machining condition 1). That is, the determination unit 110 determines whether commands of the two machining blocks are both cutting feed commands (G01 etc.) and whether one command value Q1=0 is satisfied and the other command value Q2>0 is satisfied. In the case where the determination result is YES, that is, in the case where the speed-oriented machining condition 1 is satisfied, the processing goes to S3. In other cases, the processing goes to S5.

Further, the determination unit 110 may determine that the speed-oriented machining condition 1 is satisfied also in the case where the two machining blocks read in S1 are both cutting feed blocks (G01 etc.) and the beam is off for both of the machining blocks.

S3: The determination unit 110 calculates an angle θ (0°≤θ<180°) formed by paths of the two machining blocks read in S1. The determination unit 110 determines whether the angle θ does not exceed a prescribed threshold value τ (0°≤τ<180°), that is, whether θ<τ is satisfied (speed-oriented machining condition 2). In the case where the determination result is YES, that is, the case where θ<τ is satisfied and the speed-oriented machining condition 2 is satisfied, the processing goes to S4. In other cases, the processing goes to S5.

S4: The corner deceleration processing unit 120 acquires a predetermined allowable speed difference for high-speed machining. The corner deceleration processing unit 120 typically reads the allowable speed difference for high-speed machining from a storage region which is not illustrated.

S5: The corner deceleration processing unit 120 acquires a predetermined normal allowable speed difference. The corner deceleration processing unit 120 typically reads the normal allowable speed difference from a storage region which is not illustrated.

S6: The corner deceleration processing unit 120 performs corner deceleration control by using the allowable speed difference acquired in S4 or S5. That is, the corner deceleration processing unit 120 calculates a speed difference between the two machining blocks read in S1. The speed difference is calculated for each of the X axis direction and the Y axis direction. In the case where the speed difference in the X axis direction or the Y axis direction exceeds the allowable speed difference acquired in S4 or S5, the corner deceleration processing unit 120 decelerates a tool before and behind the corner down to a speed at which the speed differences in the X axis direction and the Y axis direction do not exceed the allowable speed difference.

Second Embodiment

Figure 5A:
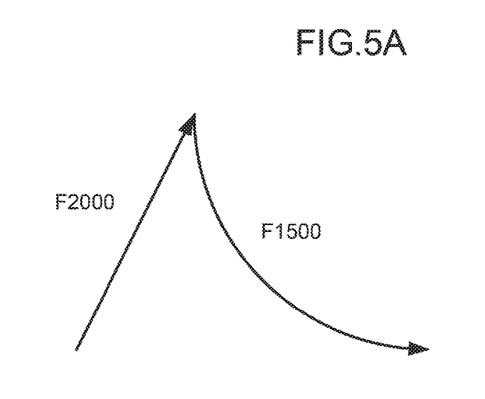
FIG. 5A illustrates an example of a corner deceleration control method employed by the numerical controller according to another embodiment of the present invention.
Figure 5B:
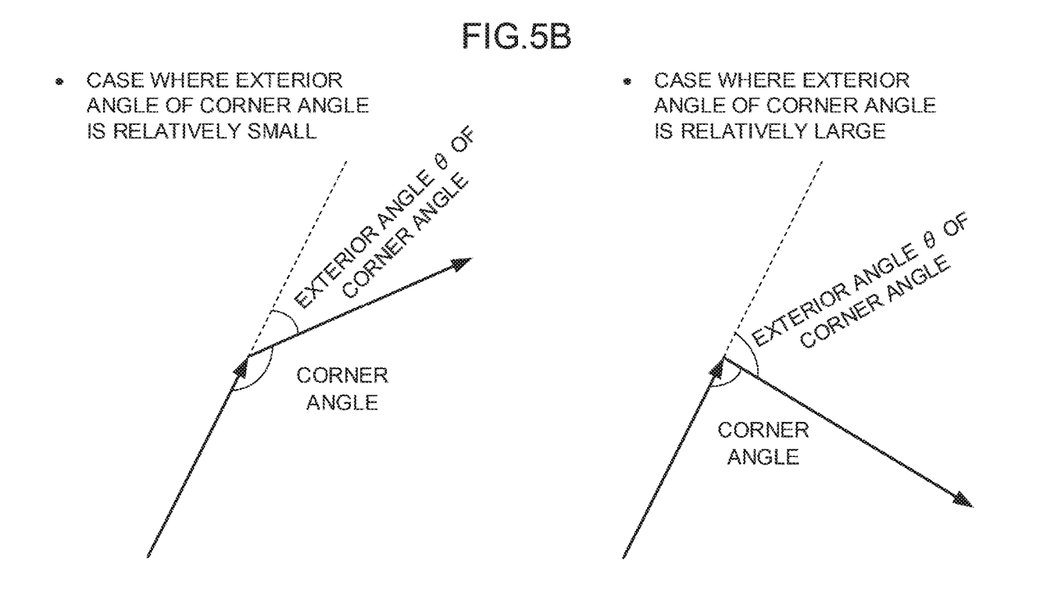
FIG. 5B illustrates an example of a corner deceleration control method employed by the numerical controller according to the other embodiment of the present invention.

As the second embodiment, an operation of the numerical controller 100 in the case of machining of paths illustrated in FIGS. 5A and 5B. FIGS. 5A and 5B are both characterized in that command values of cutting feed blocks (G01 etc.) are mutually different between adjacent machining blocks.

In FIG. 5A, though two cutting feed blocks are successive, a feed speed is changed from F2000 to F1500. In such case, it is favorable to lower a corner speed so as to correspond to the change of the feed speed. Accordingly, the determination unit 110 determines that machining placing more emphasis on accuracy than speed is to be performed.

FIG. 5B also illustrates an example in which two cutting feed blocks are successive. In the case where an exterior angle θ of the corner angle is relatively small (a corner angle is relatively large) as illustrated in the left drawing, the determination unit 110 determines that machining placing emphasis on speed is to be performed. On the other hand, in the case where the exterior angle θ of the corner angle difference is relatively large (the corner angle is relatively small) as illustrated in the right drawing, the determination unit 110 determines that machining placing emphasis on accuracy is to be performed. This determination can be executed by comparing the angle θ to a predetermined threshold value τ.

The corner deceleration processing unit 120 performs the corner deceleration processing by using the allowable speed difference for high-speed machining in the case where the determination unit 110 determines that high-speed machining is to be performed and performs the corner deceleration processing by using the normal allowable speed difference in other cases, as is the case with the first embodiment.

The operation of the numerical controller 100 in the second embodiment will be described with reference to the flowchart of FIG. 6.

S1: The determination unit 110 reads out two successive machining blocks in a machining program.

S2: The determination unit 110 determines whether the two machining blocks read in S1 are both cutting feed blocks, and whether command values (values such as a speed F) of both of the machining blocks are different from each other (speed-oriented machining condition 1). That is, the determination unit 110 determines whether the commands of the two machining blocks are both cutting feed commands (G01 etc.) and whether the command values of the two satisfy F1≠F2. In the case where the determination result is YES, that is, in the case where the speed-oriented machining condition 1 is satisfied, the processing goes to S3. In other cases, the processing goes to S5.

S3: The determination unit 110 calculates an angle θ (0°≤θ<180°) formed by paths of the two machining blocks read in S1. The determination unit 110 determines whether the angle θ does not exceed a prescribed threshold value τ (0°≤τ<180°), that is, whether θ<τ is satisfied (speed-oriented machining condition 2). In the case where the determination result is YES, that is, the case where θ<τ is satisfied and the speed-oriented machining condition 2 is satisfied, the processing goes to S4. In other cases, the processing goes to S5.

S4: The corner deceleration processing unit 120 acquires a predetermined allowable speed difference for high-speed machining. The corner deceleration processing unit 120 typically reads the allowable speed difference for high-speed machining from a storage region which is not illustrated.

S5: The corner deceleration processing unit 120 acquires a predetermined normal allowable speed difference. The corner deceleration processing unit 120 typically reads the normal allowable speed difference from a storage region which is not illustrated.

S6: The corner deceleration processing unit 120 performs corner deceleration control by using the allowable speed difference acquired in S4 or S5.

Here, the second embodiment does not use, for determination, the on/off state of a beam characteristic of laser machining, unlike the first embodiment. Accordingly, the second embodiment is applicable to cutting such as milling and water jet machining as well as laser machining.

According to these embodiments, the determination unit 110 determines whether a corner is to be machined while placing emphasis on speed or machined while placing emphasis on accuracy, by analyzing a machining program. Then, the corner deceleration processing unit 120 performs corner deceleration control by using an allowable speed difference varying depending on a determination result obtained by the determination unit 110. Accordingly, a user does not have to change an allowable speed difference depending on a machining purpose in every machining.

Here, it should be noted that the present invention is not limited to the above-described embodiments but may be altered as appropriate without deviating from the intent of the invention. In the present invention, arbitrary components in the embodiments may be transformed or omitted within the scope of the present invention.

For example, though the determination of the speed-oriented machining condition 1 (S2) and the determination of the speed-oriented machining condition 2 (S3) are performed in the above-described embodiments, only either one condition determination may be performed. Alternatively, the condition determination may be executed by reversing orders of these condition determinations.

Further, the specific determination method of the speed-oriented machining condition 1 (S2) and the speed-oriented machining condition 2 (S3) described in the above embodiments is merely an example and the determination of the speed-oriented machining condition 1 (S2) and the speed-oriented machining condition 2 (S3) may be performed by other arbitrary determination methods.

The embodiments of the present invention have been described thus far. However, the present invention is not limited to the above-described embodiments but can be embodied in other embodiments by making arbitrary alterations.

The invention claimed is:

1. A numerical controller comprising:
   a corner deceleration control unit that executes corner deceleration control based on a speed difference between cutting feed speeds in a leading block and a following block of code executed in a machining program across a corner between the leading block and the following block, and an allowable speed difference which is predetermined; and
   a determination unit that analyzes the machining program so as to determine which machining is to be performed between machining placing emphasis on accuracy and machining placing emphasis on speed,
   wherein the corner deceleration control unit varies the allowable speed difference in accordance with a determination result of the determination unit, and
   wherein the determination unit determines which machining is to be performed between machining placing emphasis on accuracy and machining placing emphasis on speed, based on a comparison between an ON/OFF state of a beam as indicated in the leading block and the ON/OFF state of the beam in the following block.

2. The numerical controller according to claim 1, wherein the determination unit determines which machining is to be performed between machining placing emphasis on accuracy and machining placing emphasis on speed, based on an angle formed by the leading block and the following block.

3. The numerical controller according to claim 1, wherein the determination unit determines which machining is to be performed between machining placing emphasis on accuracy and machining placing emphasis on speed, based on a difference between command values of leading block and the following block.

4. The numerical controller according to claim 1, wherein the corner deceleration control unit executes the corner deceleration control by using the allowable speed difference for high-speed machining in a case where the determination unit determines that speed is to be emphasized and executes the corner deceleration control by using the allowable speed difference which is normal in a case where the determination unit determines that accuracy is to be emphasized.

5. A numerical controller comprising:
   a determination unit that analyzes a machining program so as to determine whether a leading block and a following block of code executed in a machining program across a corner between the leading block and the following block:

1) include a laser ON command and a laser OFF command, and 2) include an outer angle of machining trajectory difference less than a threshold, a corner deceleration control unit that controls an allowable speed difference of for the machining in accordance with:

a first speed setting when the determination by the determination unit indicates that the leading block and the following block do not satisfy both conditions (1) and (2), and a second speed setting when the determination by the determination unit indicates that the leading block and the following block satisfy both conditions (1) and (2).

* * * * *